Sept. 19, 1933.   C. R. EDWARDS   1,927,310
WELL CLEANING APPARATUS
Filed Nov. 16, 1926   13 Sheets-Sheet 1

Inventor
Charles R. Edwards
By Hardway Cather
Attorneys

Sept. 19, 1933.   C. R. EDWARDS   1,927,310
WELL CLEANING APPARATUS
Filed Nov. 16, 1926   13 Sheets-Sheet 2
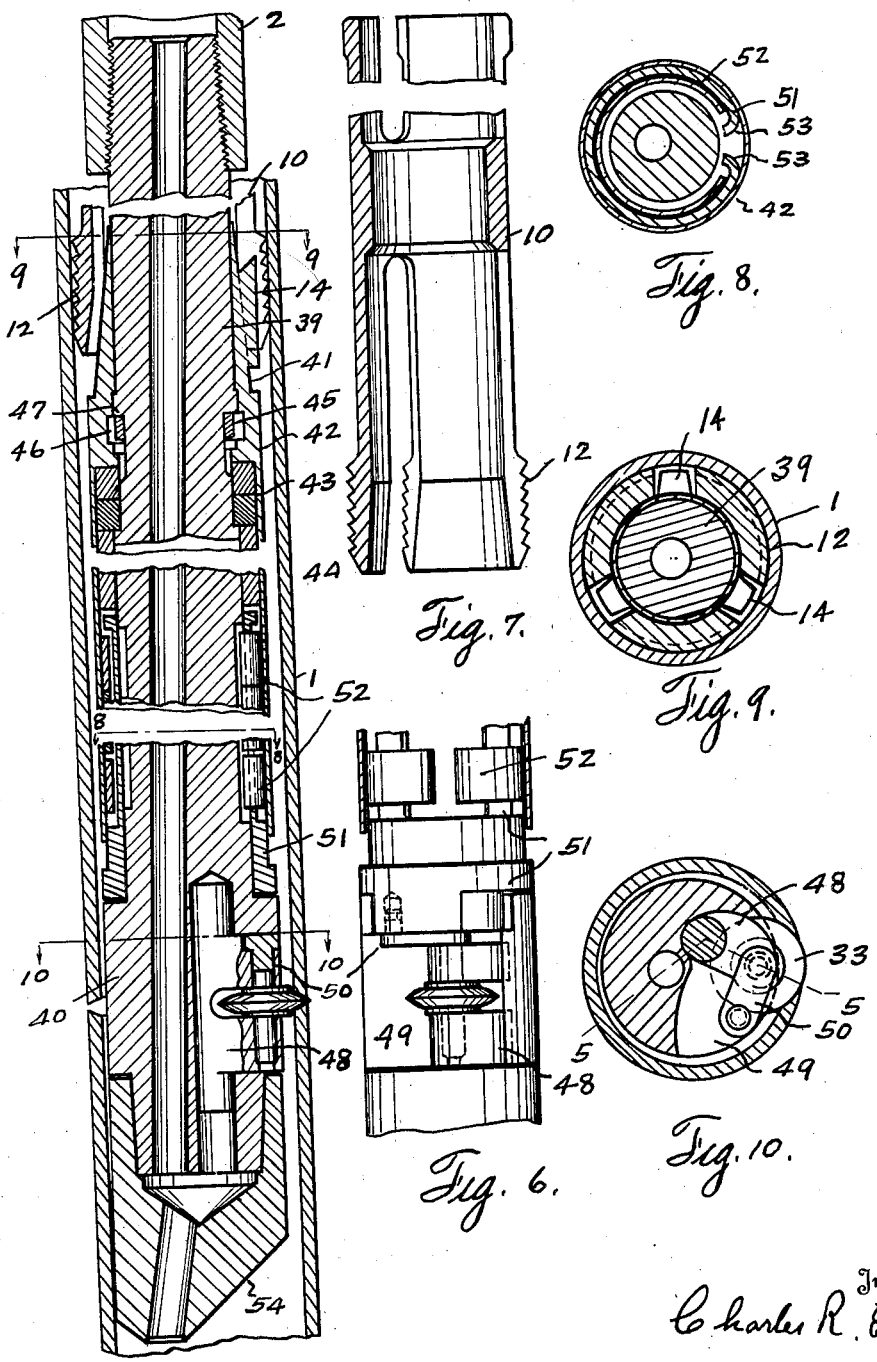

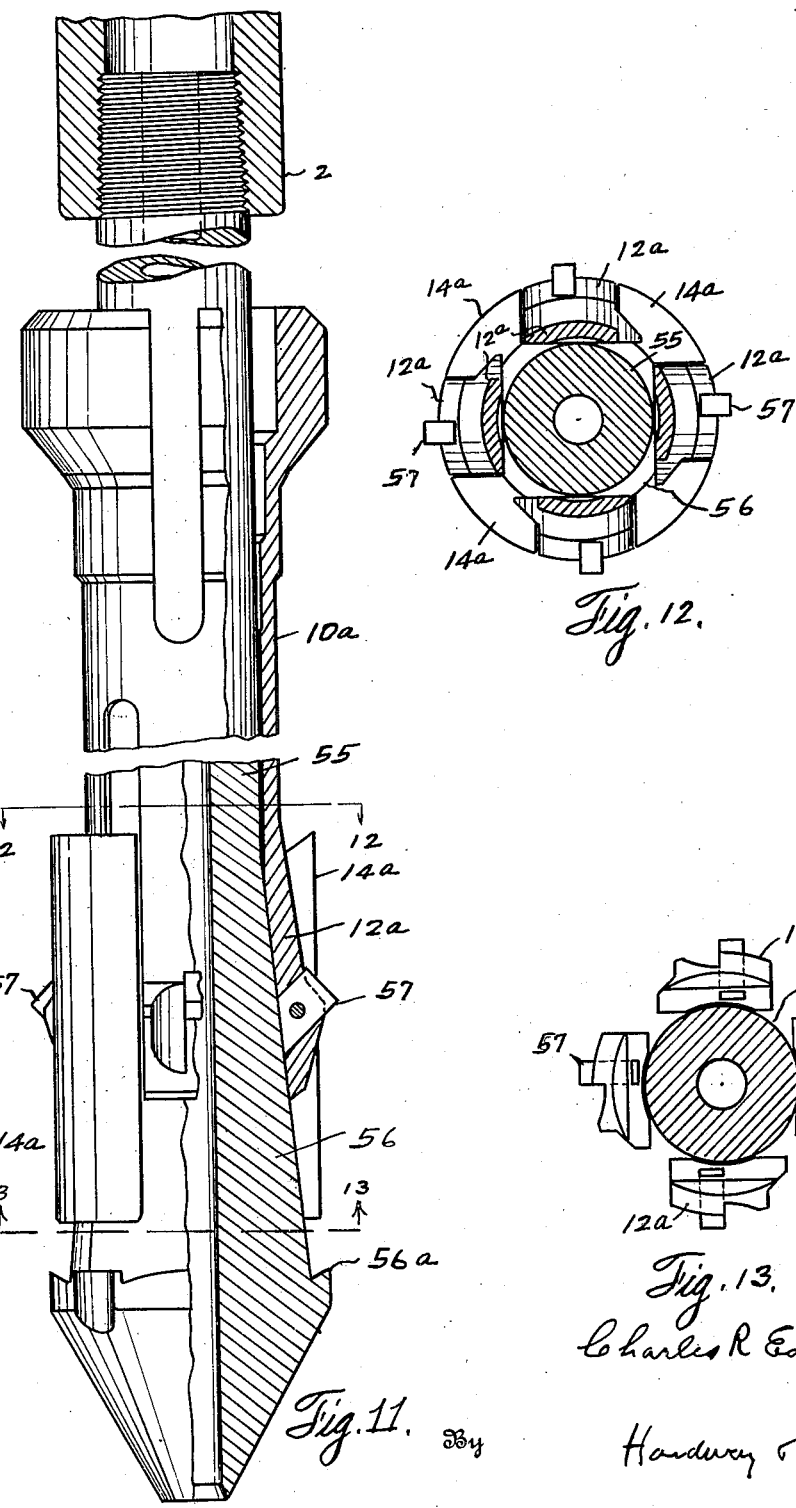

Sept. 19, 1933.  C. R. EDWARDS  1,927,310
WELL CLEANING APPARATUS
Filed Nov. 16, 1926   13 Sheets-Sheet 4

Inventor
Charles R. Edwards
By Hardway Cathry
Attorneys

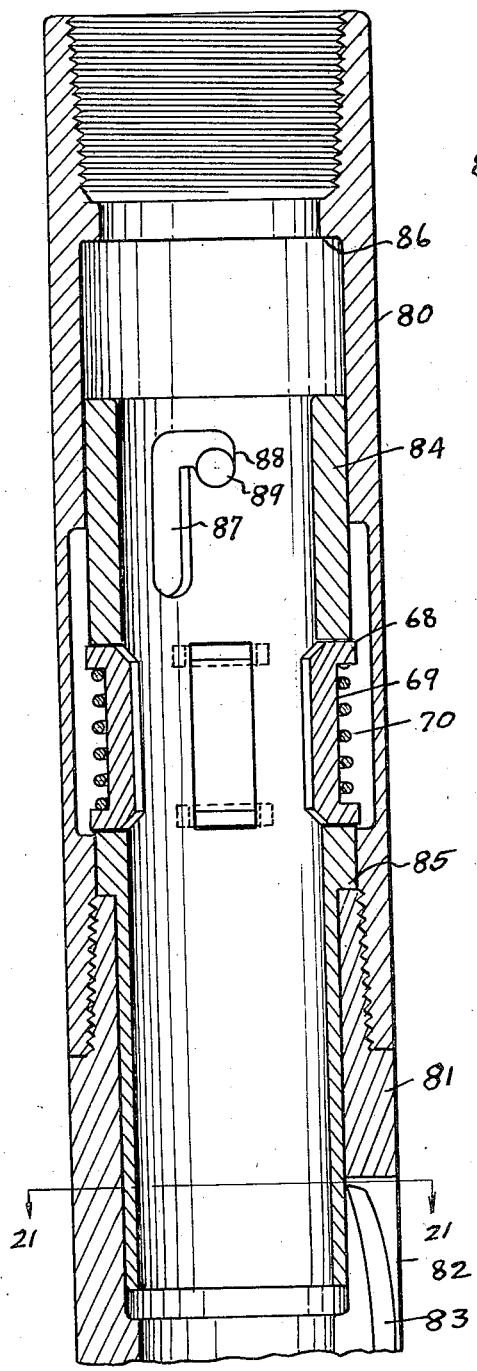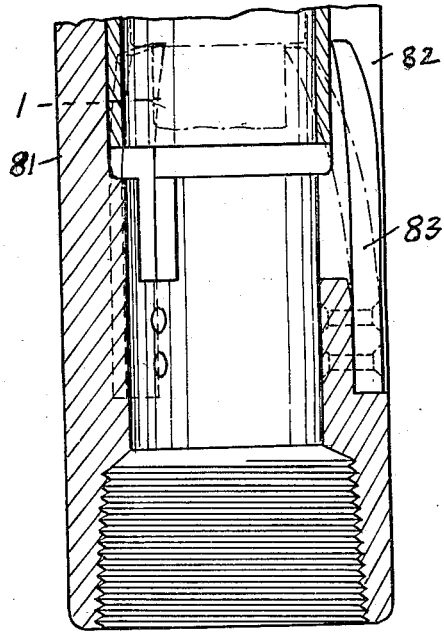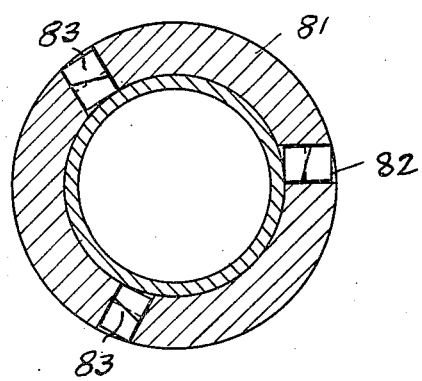

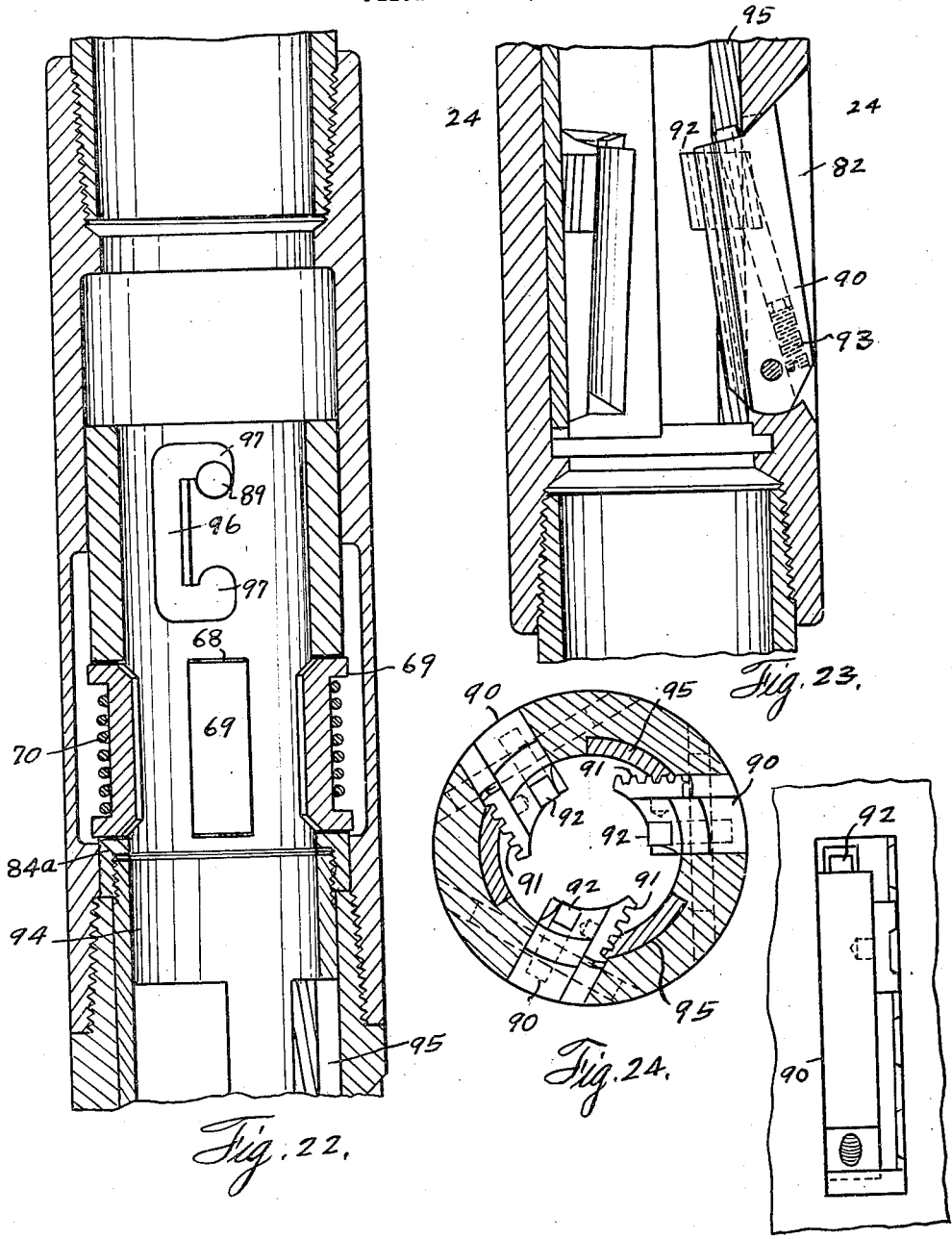

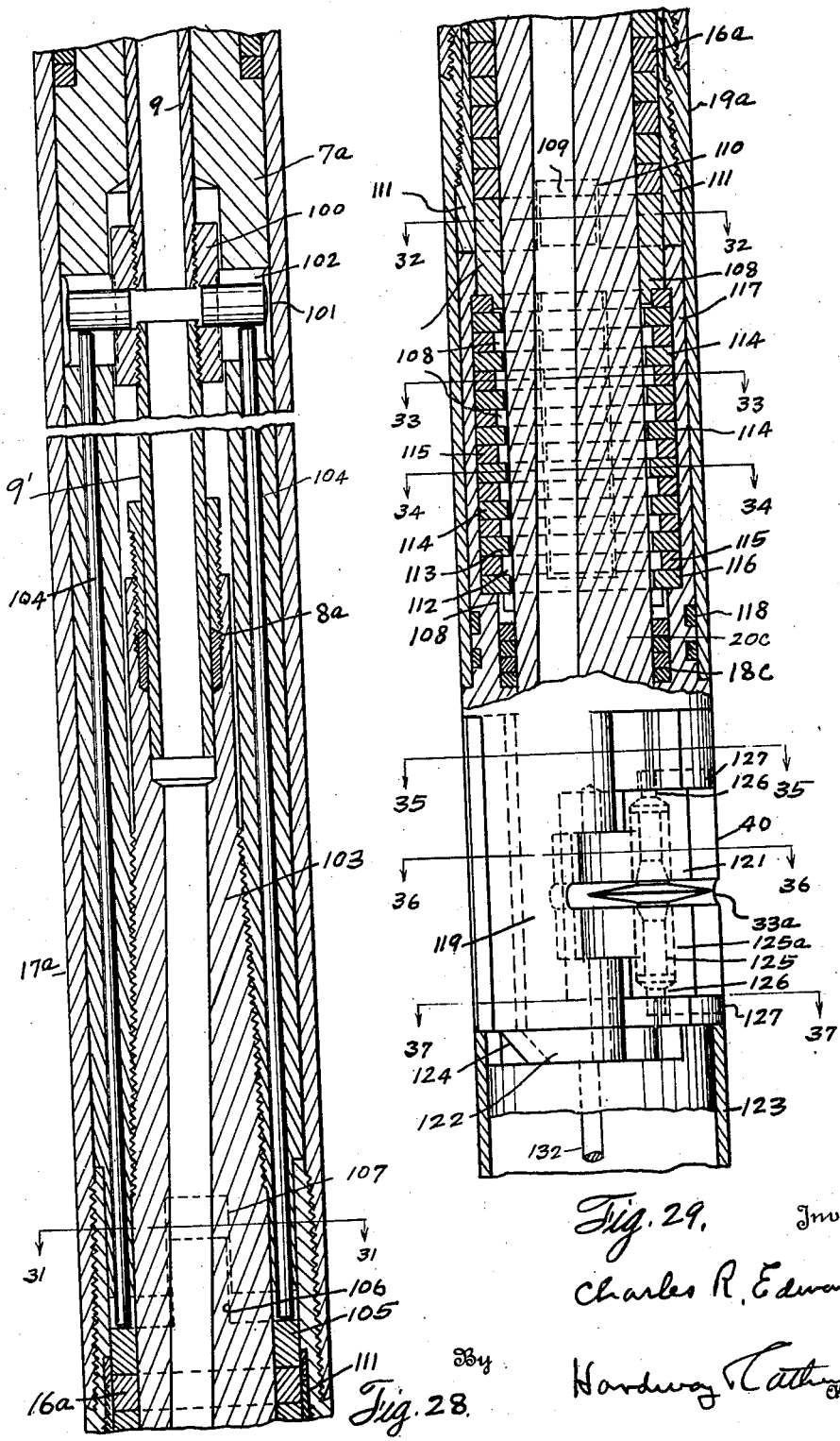

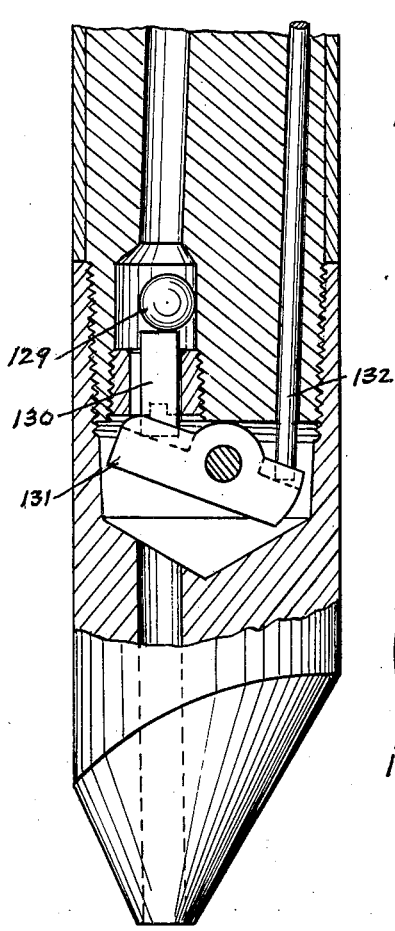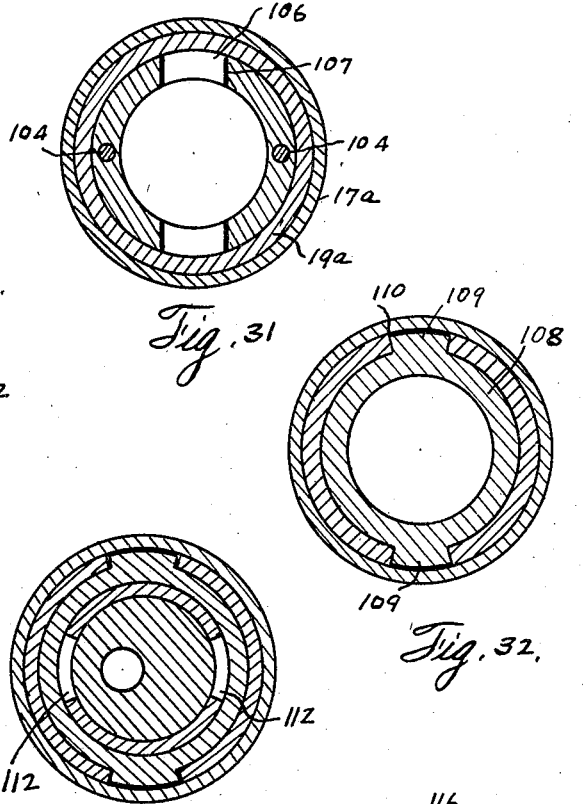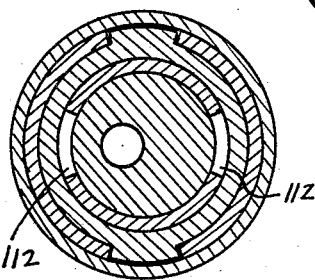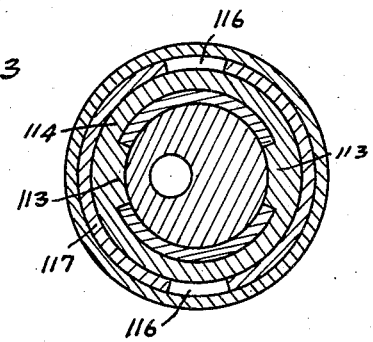

Sept. 19, 1933.   C. R. EDWARDS   1,927,310
WELL CLEANING APPARATUS
Filed Nov. 16, 1926   13 Sheets-Sheet 11

Inventor
Charles R. Edwards

By Hardway Cathey
Attorney

Sept. 19, 1933.  C. R. EDWARDS  1,927,310
WELL CLEANING APPARATUS
Filed Nov. 16, 1926   13 Sheets-Sheet 12
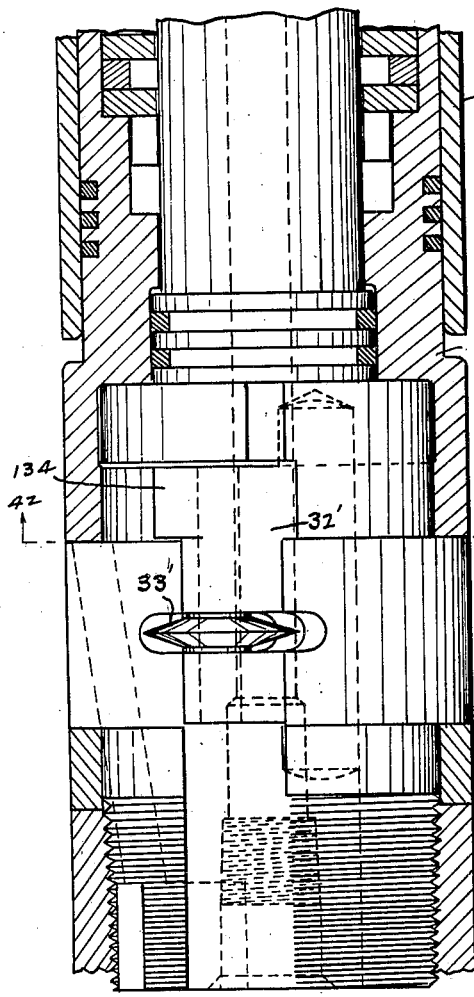
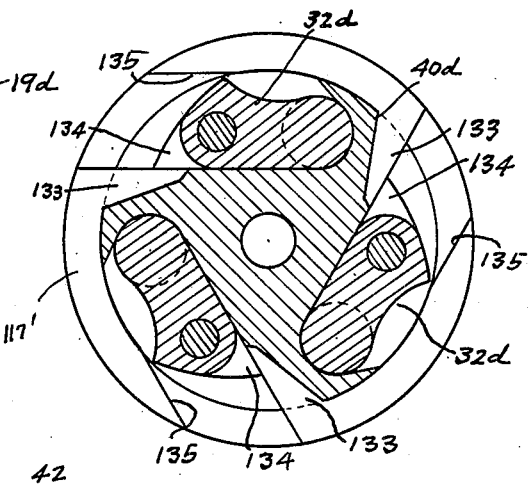
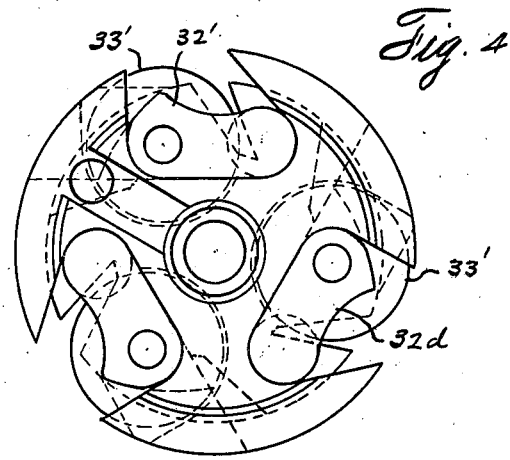
INVENTOR.
Charles R. Edwards
BY
Hardway Cathey
ATTORNEYS

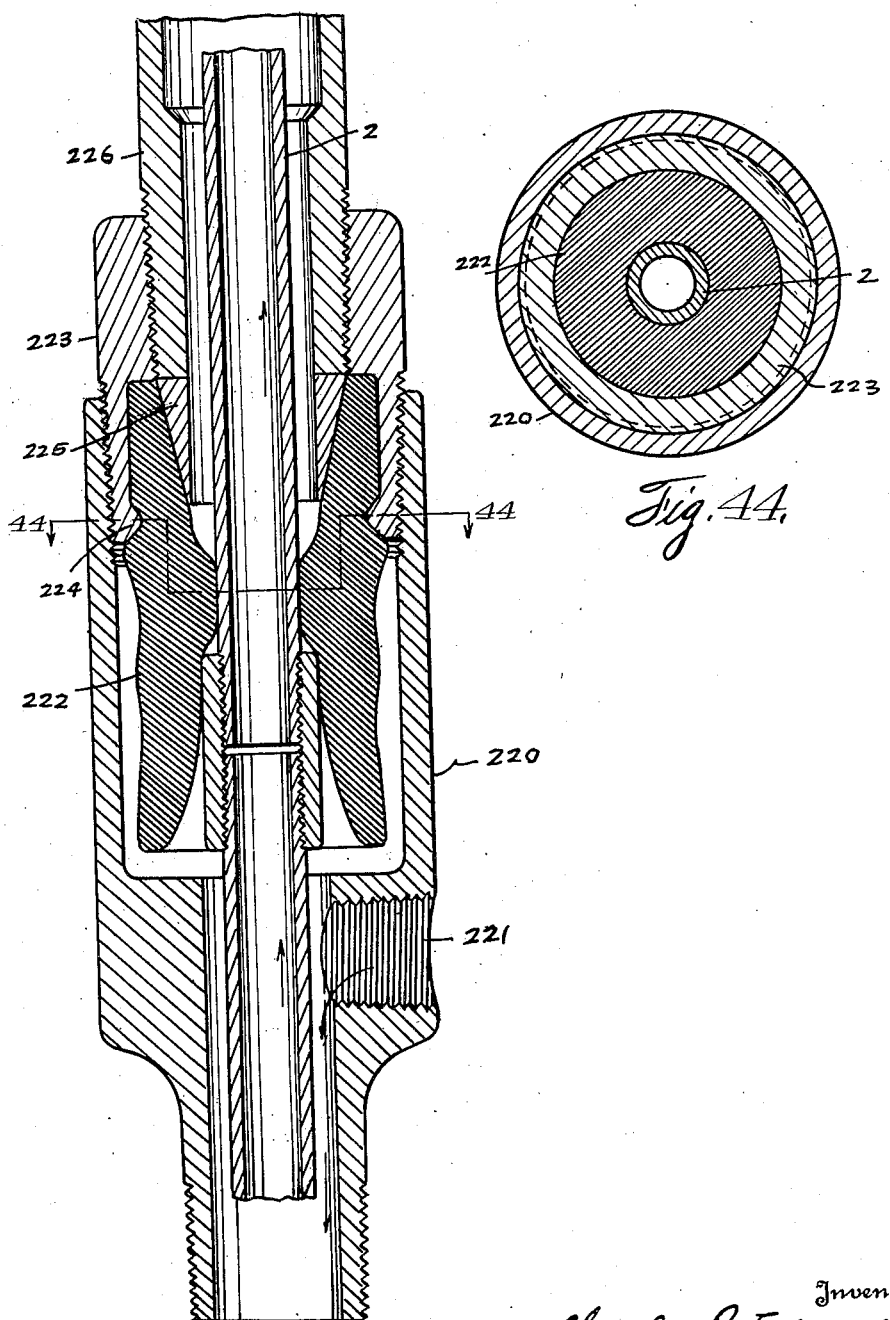

Patented Sept. 19, 1933

1,927,310

UNITED STATES PATENT OFFICE 1,927,310

WELL CLEANING APPARATUS

Charles R. Edwards, Houston, Tex.

Application November 16, 1926
Serial No. 148,691

38 Claims. (Cl. 81—193)

This invention relates to new and useful improvements in a well cleaning apparatus.

One object of the invention is to provide an apparatus of the character described whereby well drilling and oil producing equipments, such as pipe, drill stems, casings, tubing, screens, packers and the like, when stuck in a well bore, may be dislodged and removed from the bore expeditiously and inexpensively, without injury or with a minimum of injury to the removed equipment.

Another object of the invention resides in the provision of an apparatus of the character described embodying the combination with a casing cutter, whereby stuck casing or pipe may, if necessary, be cut into sections, of a releasable grapple adapted to engage the severed section and withdraw the same from the bore all at a single trip down into the bore.

It is a further object of the invention to provide an apparatus of the character described embodying a novel construction and a novel combination of means whereby foreign material may be dislodged and washed from the pipe to be pulled and said pipe pulled in a single string, or cut into sections and a section thereof removed, all at a single trip of the apparatus into the bore.

The invention resides principally in the use upon a single string of operating pipe of a pulling tool and a cutting tool whereby sections of the stuck pipe may be severed and pulled from the well all at one trip into the hole.

With the above and other objects in view this invention has particular relation to certain novel features of construction, operation and arrangement of parts, an example of which is given in this specification and illustrated in the accompanying drawings, wherein:—

Figure 5 shows a vertical sectional view of another form thereof.

Figure 6 shows a fragmentary side view of the form shown in Figure 5.

Figure 7 shows a vertical sectional view of the pipe engaging slip employed.

Figure 8 shows a cross sectional view taken on the line 8—8 of Figure 5.

Figure 9 shows a cross sectional view taken on the line 9—9 of Figure 5.

Figure 10 shows a cross sectional view taken on the line 10—10 of Figure 5.

Figure 11 shows a side elevation, partly in section, of another form of the device.

Figure 12 shows a cross sectional view taken on the line 12—12 of Figure 11.

Figure 13 shows a cross sectional view taken on the line 13—13 of Figure 11.

Figures 19 and 20 show vertical sectional views of the upper and lower ends respectively of another type of cutter employed.

Figure 21 shows a cross sectional view thereof taken on the line 21—21 of Figure 19.

Figures 22 and 23 show vertical sectional views of the upper and lower ends respectively of another type of outside cutter.

Figure 24 shows a cross sectional view thereof taken on the line 24—24 of Figure 23.

Figure 25 shows a fragmentary side elevation thereof.

Figures 26 to 30 inclusive, show vertical sectional views illustrating another type of cutter, said views showing sections of the cutter from the upper to the lower end thereof.

Figure 31 shows a cross sectional view taken on the line 31—31 of Figure 28.

Figure 32 shows a cross sectional view taken on the line 32—32 of Figure 29.

Figure 33 shows a cross sectional view taken on the line 33—33 of Figure 29.

Figure 34 shows a cross sectional view taken on the line 34—34 of Figure 29.

Figure 35:
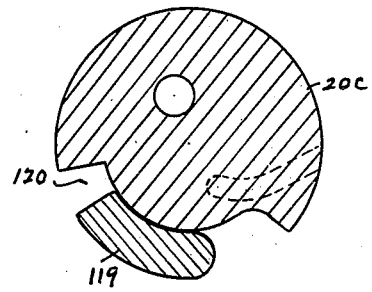

Figure 35 shows a cross sectional view taken on the line 35—35 of Figure 29.

Figure 36:
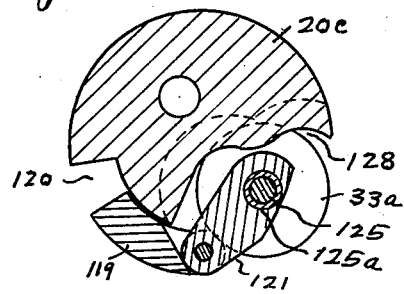

Figure 36 shows a cross sectional view taken on the line 36—36 of Figure 29.

Figure 37:
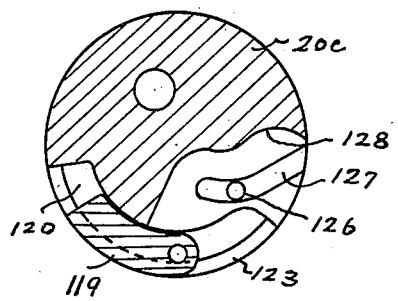

Figure 37 shows a cross sectional view taken on the line 37—37 of Figure 29.

Figure 38:
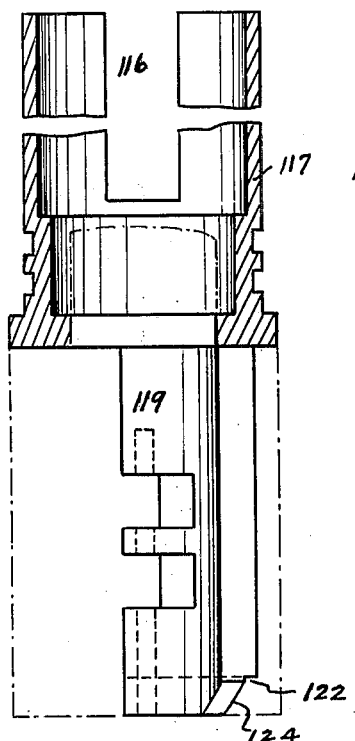

Figure 38 shows a vertical sectional view of the clutch sleeve employed.

Figure 39:
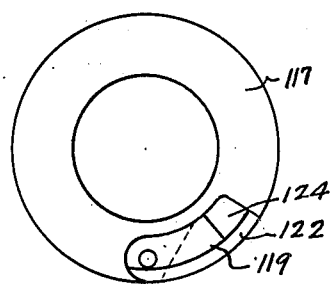

Figure 39 shows a plan view thereof.

Figure 40 shows a side elevation, partly in section, of a modified form of the cutter employed.

Figure 41 shows a plan view thereof.

Figure 42 shows a cross sectional view taken on the line 42—42 of Figure 40.

Figure 43 shows a vertical sectional view of the blow-out preventer employed, and Figure 44 shows a cross sectional view thereof, taken on the line 44—44 of Figure 43.

Referring now more particularly to the drawings, wherein like numerals of reference designate similar parts in each of the figures the numeral 1 designates a section of pipe, or casing to be pulled from the well bore. The numeral 2 designates a drill stem which works within the casing and extends above the derrick floor and is handled by the drilling rig, said derrick and rig being of any well known construction and familiar to those skilled in the art of well drilling. An annular retainer plate 3 is located at the lower end of the drill stem within the housing 4, which is screwed onto the lower end of said stem. Within the housing 4 and sustained on the bottom thereof there is a coil spring 5 which supports a cup shaped plunger 6 located beneath the retainer plate 3. Threaded into the lower end of the housing 4, and depending beneath it there is a tubular mandrel 7 whose upper end has a stuffing box 8. There is a tube or stem 9 which works through the mandrel and which is surrounded by said stuffing box and to the upper end of which the plunger 6 is secured.

There is a tubular pipe engaging slip 10, fitted over the mandrel, and whose upper end is vertically slotted and enlarged, forming a yieldable pipe grip 11 and the lower end of the slip is also slotted vertically forming the expansible outwardly toothed pipe engaging jaws 12, whose inner sides are flared outwardly. Fitted over the lower end of the mandrel there is an upwardly tapering jaw expander 13 which carries a plurality of vertical keys 14 adapted to work in the lower end slots of the slip. The lower end of the mandrel has an annular shoulder 15 which supports the swivel washers 16 and the lower end of the tapering expander is enlarged and formed into a housing 17 which surrounds the lower end of the mandrel and has an inside annular shoulder 18 which rides on the washers 16. Threaded into the lower end of this housing 17 there is a sleeve-like retainer 19 whose upper end is spaced from the lower end of the mandrel so as to permit a limited vertical movement of the mandrel and attached parts relative to the housing 17. The mandrel also is rotatable relative to the slip 10, the expander 13 and the retainer 19.

There is a tubular cutter body 20 shown in two sections, but which may be made as a unit. The upper end of the cutter body is reduced forming an outside shoulder 21 and an upwardly extended sleeve 22 which is threaded into the lower end of the mandrel 7 and seated on the shoulder 21 and surrounding the sleeve 22 there is a coil spring 23 which supports the lock ring 24, which surrounds the sleeve 22. The sleeve 22 has a perforation 25 to receive a locking ball 26 and the ring 24 has an inside annular cavity 27 into which said lock ball normally projects.

Working through the tubular cutter body 20 and the sleeve 22 thereof there is a tubular slidable gear member 28, which is splined in said sleeve by the key 29. The lower end of the stem 9 is attached to the upper end of this gear member, preferably by a threaded connection. The lower part of the gear member 28 is triangular in cross section, and its faces are provided with similar diagonal gear teeth 30.

Slidably mounted in suitable substantially radial bearings 31 in the cutter body 20 are the cutter carriers 32 whose inner ends are formed into gear racks which are in mesh with the corresponding diagonal teeth of the respective faces of the member 28, and the outer ends of the carriers have the discs, or other suitable cutters 33 mounted therein to rotate on a common horizontal plane.

The gear member 28 is tubular, as stated, and the lower end of its bore is flared forming a valve seat 34. Fixed to the bit 35, carried by the lower end of the body 20, there is an adjustable cone shaped valve 36, aligned underneath and adapted to seat in the seat 34. The bit has suitable water courses through it leading outwardly from the interior of the body 20.

It is to be noted that there is a tubular housing 37 depending from and preferably formed integral with the retainer 19, and whose lower end is rotatably fitted over the shoulder 21 of the cutter body. This housing encloses the spring 23 and lock ring 24, and within it, above said ring, are the anti-friction washers 38 which are interposed between said ring and the lower end of the retainer 19.

In operation this type of apparatus, which is illustrated in Figures 1, 2, 3 and 4, is attached to the lower end of the drill stem 2 and is lowered into the casing or pipe to be cut in the well bore, to the desired point. If the casing has become clogged with debris the same is loosened up by the bit 35 and washed out by pumping fluid down through the drill stem. While accomplishing this operation the lock ball 26 is seated in the side socket 28' in the gear member 28 and being retained in locking relation therein by the lower end of the lock ring 24 so as to lock said gear member with the sleeve 22 to prevent the actuation of the cutter carriers 32. When the desired place for cutting the casing is reached the drill stem is pulled upwardly, while the keys 14 are aligned with the lower end slots of the slip 10, and the expander 13 will wedge between the jaws 12 into secure engagement with the inner walls of the casing 1. This upward pull will lift the weight of the casing above and place the spring 23 under compression and also carry the lock ball 26 up into the annular cavity 27 in the lock ring 24 and unseat it from the socket 28'. The drill stem is then rotated to the right and pressure is applied against the plunger 6 from above, compressing the spring 5 and moving the stem and gear member 28 downwardly and operating, through the gear teeth 30, to force the cutter carriers 32 outwardly and to carry the cutters 33 into rolling contact with the inside of the casing to be cut. A continuous pressure is applied to said cutters and as the stem is rotated will gradually cut into and eventually sever the casing. While the casing is being cut it is also subjected to an upward pull so as to relieve the cutters, as much as possible, of the weight of the casing above the cut, to the end that these cutters will not be wedged or pinched between the adjacent ends of the severed sections and thereby be injured or broken.

As the casing is being cut the pressure on the plunger 6 forces the gear member 28 downwardly and when the cut is completed the valve seat 34 seats on the valve 36 and blocks the fluid passageway and stalls the pressure pump thereby notifying the operator that the cut has been completed. When pressure is relieved from the plunger 6 the spring 5 will elevate the stem 9 and gear member 28 will operate through the teeth 30 to withdraw the cutter carriers and cutters.

The apparatus may now be withdrawn from the bore and the slip 10 will retain and bring the severed section to the surface.

If the cut off section cannot be dislodged the slip can be released by lowering the aparatus until the keys 14 are carried beneath the slip 10 and then turning the drill stem until said keys are carried out of alignment with their slots and underneath the jaws 12 and an upward movement then exerted through the stem which will carry said keys into engagement with the lower ends of the jaws 12 and the cutter then elevated in the casing and another cut taken, as before.

In case a short section is cut off the upper end of the stuck casing it can often be elevated for a distance in the bore and released, and the apparatus sent back down into the remaining stuck casing and another section cut off and both severed sections removed at one trip.

In the form shown in Figures 5 to 10 inclusive the tubular mandrel 39 is attached directly to the stem 2 and its lower end constitutes the cutter body 40, which is preferably formed integral therewith. The slip 10, in this form, is fitted over the mandrel and its dogs 12 are adapted to be expanded by the flared expander 41, which is fitted over the mandrel and has the keys 14, which are adapted to perform the functions as hereinbefore explained, in connection with the description of Figures 1 to 4. The expander is extended downwardly forming a surrounding housing 42 and within this housing and abutting the lower end of the expander are the swivel rings 43 beneath which on the mandrel is the thrust nut 44 which supports said expander. The numeral 45 designates an open retaining ring which in assembling may be sprung open in the larger inside annular groove 46 in the expander as said expander is slipped down over the mandrel, until it passes the external annular shoulder 47, of the mandrel, and then contracts and engages underneath said shoulder and locks, or keys the expander, against upward movement on the mandrel.

There is a cutter carrier 48 hinged and adapted to work in a side slot 49, cut in the side of the cutter body 40. The outer end of this carrier carries a disc-like cutter, as 33, rotatable in a horizontal plane. There is a link 50, pivotally connected at one end to the outer end of the cutter carrier, and at its other end this link has a pivotal connection with the open friction sleeve 51 which surrounds the cutter body 40 beneath the nut 44 and within the housing 42. A series of open spring friction rings 52 are fitted around the sleeve 51 within the housing 42 and in frictional contact with said housing. The ends of the friction rings are inwardly turned forming hooks, as 53, which engage over the free edges of the sleeve 51.

The lower end of the carrier body has a guide point 54 which also retains the cutter carrier in place. The watercourse through the mandrel continues on down through the cutter body and guide point 54.

In operating this form of cutter the apparatus is let down into the casing to be cut to the desired location, said casing being washed free of detritus, if necessary, as hereinbefore explained. An upward pull on the mandrel will cause the slip 10 to engage the casing, as above explained. The mandrel is now rotated to the right, the slip and expander remaining stationary. The friction rings 52 and sleeve 51 will be retarded by the friction of the former with the housing 42 and this will operate through the link 50 to swing the cutter carrier outwardly and carry the cutter 33 into contact with the inside wall of the casing to be cut and a continued rotation of the mandrel will cause said cutter to roll around and eventually sever the casing. Thereupon a slight turn of the mandrel, to the left, withdraws or closes the cutter carrier and cutter into the slot 49 and clear of the casing.

In the form shown in Figures 11, 12 and 13 the tubular mandrel 55 is connected to the lower end of the drill stem 2 and its lower end is flared forming an expander 56. In this form the slip 10a of the general form of the slip 10, hereinabove described, has the expansible jaws 12a and the lower end slots adapted to receive the keys 14a carried by the expander 56. The jaws 12a carry outwardly projecting tool bit cutters 57.

In operation this type of cutter is lowered into the casing to the desired point and rotated to the right and in order to feed out the cutters an upward pull is exerted on the mandrel which forces the cutters outwardly and upwardly until the casing is severed. The severed section is supported by the slip and cutters, while the slip rests on the annular shoulder 56a at the lower end of the mandrel.

The cut off section may be released by lowering the mandrel until the keys 14a clear the lower ends of the jaws 12a and then by turning the mandrel until the keys 14a align under said jaws. An upward pull will then release the apparatus from the casing.

Figures 1, 2, 3, 4:
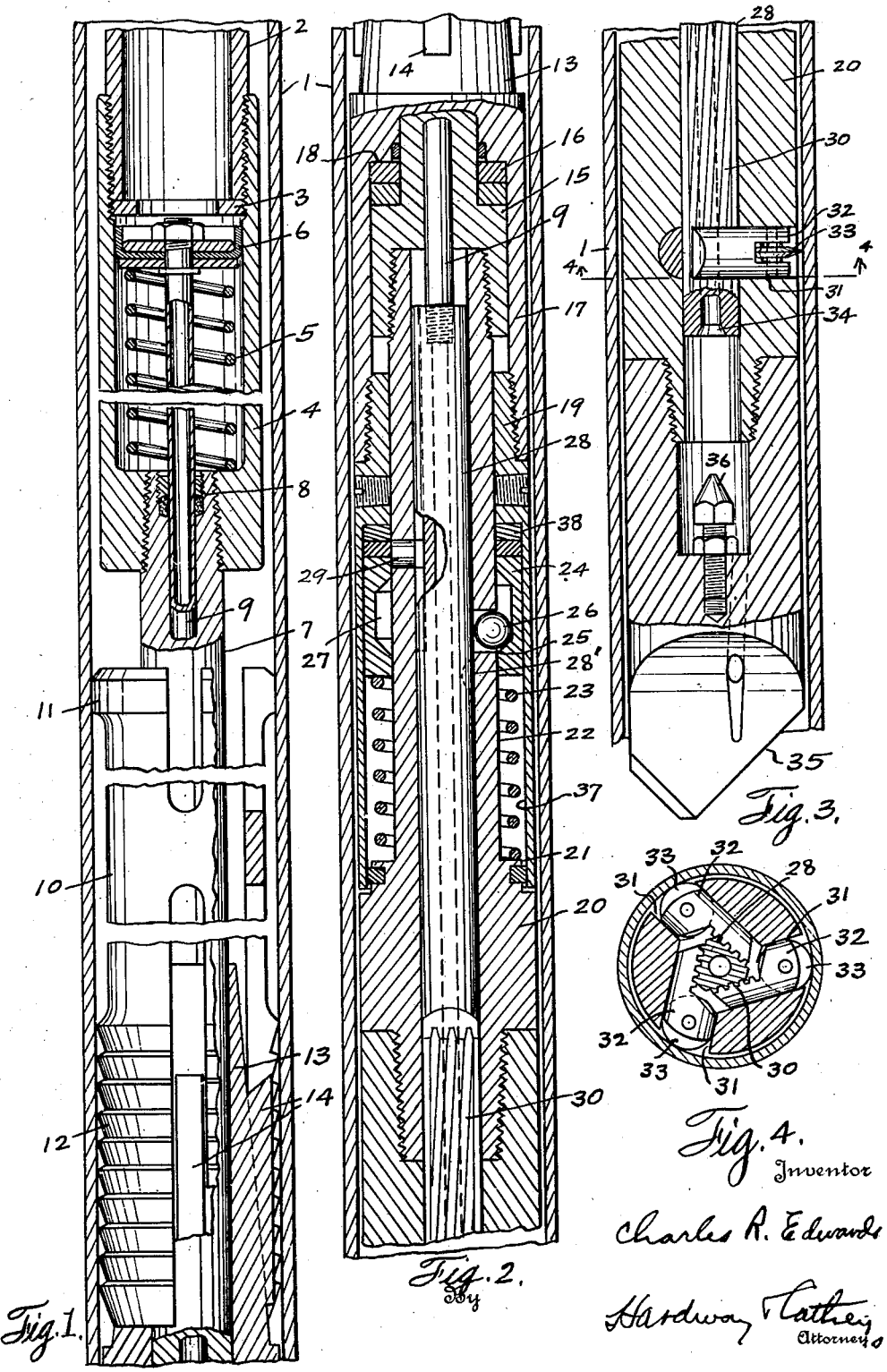
Figures 1, 2 and 3 show vertical sectional views of the upper, intermediate and lower sections of one form of casing cutter and pipe remover.
Figure 4 shows a cross sectional view taken on the line 4—4 of Figure 3.
Figure 15:
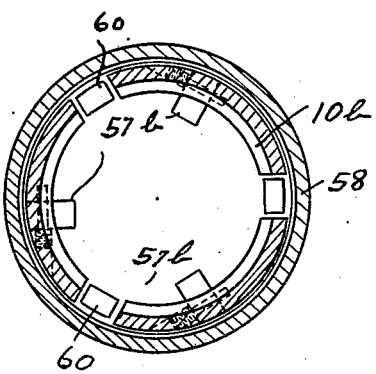
Figure 15 shows a cross sectional view thereof, taken on the line 15—15 of Figure 14.
Figure 14:
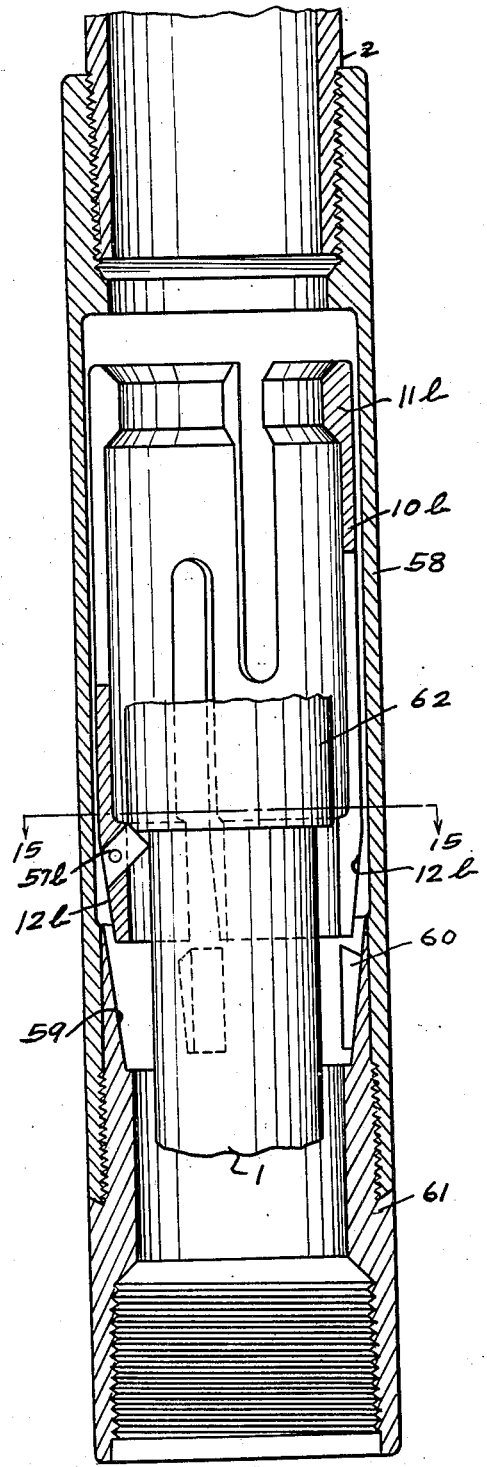
Figure 14 shows a vertical sectional view of another type of casing cutter and remover.

In the form shown in Figures 14 and 15 an outside cutter is shown very similar to the form shown in Figures 11 to 13 but whose parts, generally speaking, are reversely arranged.

In this form there is a tubular housing 58 attached to the lower end of the drill stem 2, and threaded into the lower end of this housing there is an upwardly flared seat 59 having the vertical keys 60. This seat is extended downwardly and internally threaded at its lower end forming a coupling 61 for the connection of the conventional rotary shoe, or any other tool thereto. Within the housing 58 there is the pipe engaging slip 10b vertically slotted at its upper and lower ends and whose upper end has the inside, yieldable pipe grip 11b. The lower end of this slip is formed with separate contractable pipe engaging jaws 12b which carry the inwardly projecting tool bit cutters 57b.

This apparatus, in operation, is let down into the bore, over the pipe 1, to the point where the cut is to be made and the keys 60 aligned with the lower end slots of the slip and an upward pull then exerted on the drill stem. The seat 59 thus contracts the jaws 12b forcing the cutters 57b into contact with the pipe to be cut, or against the lower end of the coupling 62, connecting the sections, or joints, of said pipe 1. The drill stem is then rotated to the right and fed upward until said pipe will be cut in two, or said collar 62 will be cut away, permitting the sections of the pipe 1 to separate, and the severed upper section may be then pulled out by an upward pull on the drill stem, said jaws 12b and cutters 57b engaging with and supporting said section in the process of its removal. If a section cannot be cut for any reason the stem 1 and housing 58 may be lowered until the keys 60 clear the lower end of the slip 10b, said slip being held stationary by the grip 11b. The stem is then turned to align said keys underneath the slip jaws and the apparatus may then be moved upwardly around the pipe 1, for another cut, or withdrawn therefrom.

Figure 16:
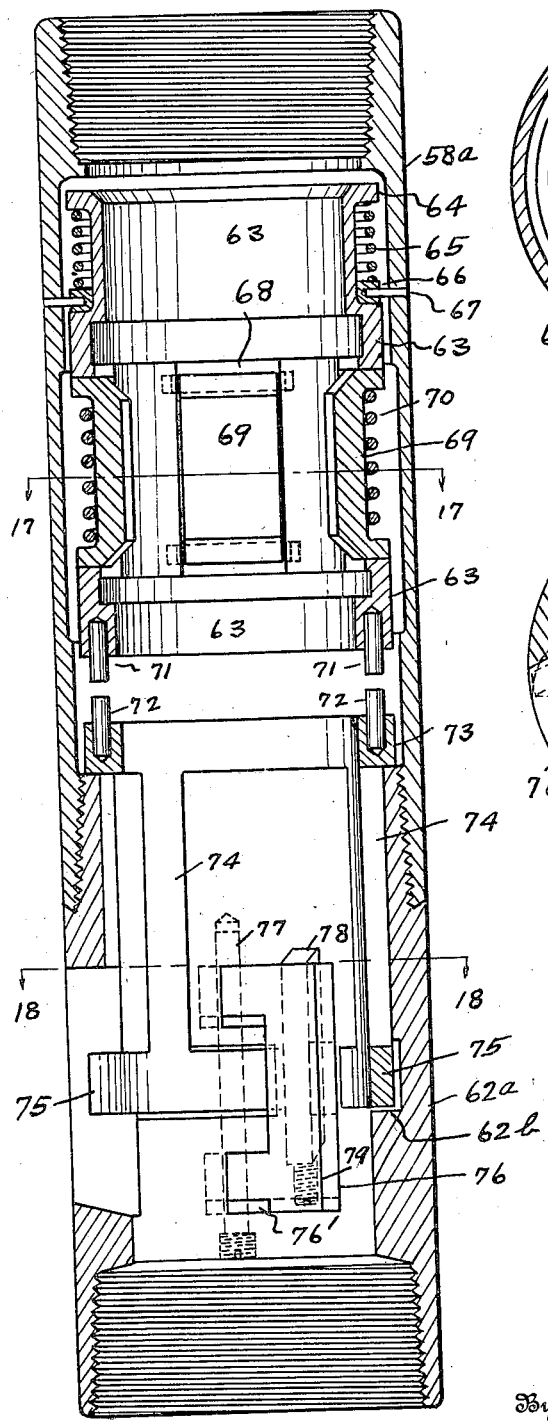
Figure 16 shows a vertical sectional view of another type of casing cutter specially adapted for cutting away the couplings connecting the sections of the casing or pipe.
Figure 17:
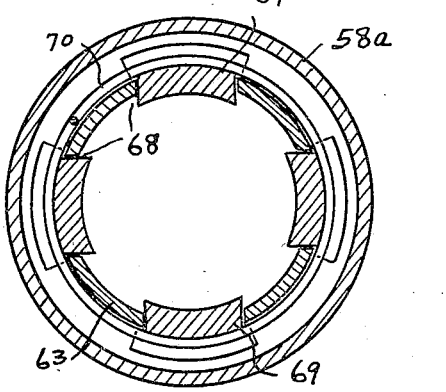
Figure 17 shows a cross sectional view taken on the line 17—17 of Figure 16.
Figure 18:
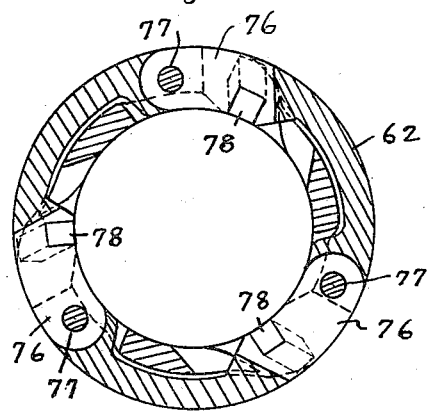
Figure 18 shows a cross sectional view thereof taken on the line 18—18 of Figure 16.
Figures 26, 27:
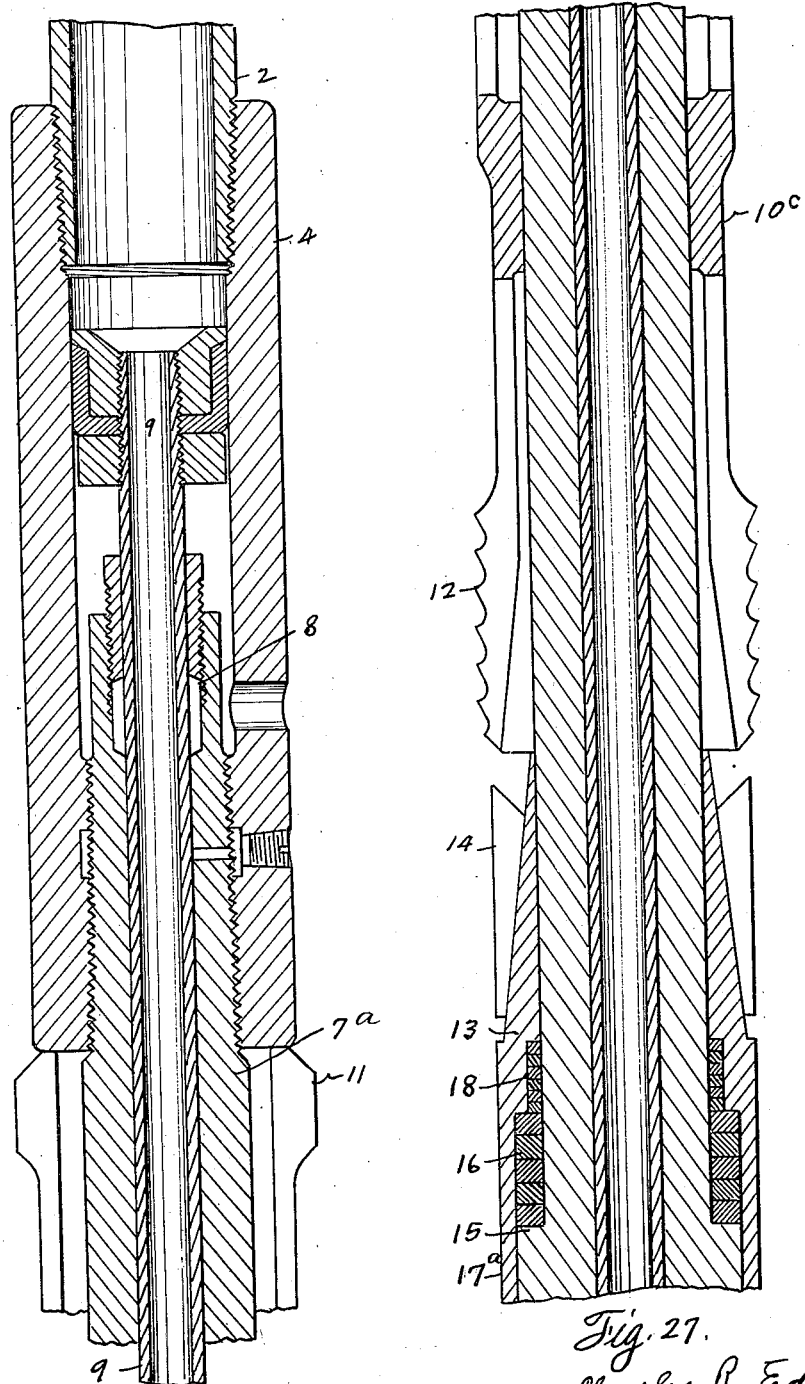

There is another type of outside cutter illustrated in Figures 16, 17 and 18 wherein the tubular housing 58a is provided and adapted to be attached to the lower end of the drill stem 2. Attached to the lower end of this housing there is a tubular cutter body 62a having an inside annular shoulder 62b.

Within the housing there is a tubular controller 63, whose upper end has an external annular flange 64 which rests on a coil spring 65, which in turn is seated on the ring 66 secured within the housing by suitable screw supports 67. The controller 63 has radial slots 68 in which the pipe grips 69 are inserted and surrounding these grips there is a coil spring 70 permitting radial movement of the grips but holding them yieldingly against the outside of the pipe to be cut.

The lower end of the controller has a plurality of depending pins, or fingers 71, adapted to be interlocked with similar pins 72 upstanding from the upper end of the cutter operator. This operator includes the ring 73 and the depending arms 74 carried thereby and whose lower ends are formed with arcuate heads 75, disposed above the shoulder 62b.

The cutter body has a plurality of cutter carriers 76, mounted to hinge on the vertical pins 77, and which work in cut out portions forming windows 76' in the sides of the body 62a. Each carrier has a cutter 78, whose cutting edges or points project above the carriers and the cutters are vertically adjustable through the supporting screws, as 79.

In operation an ordinary rotary shoe, or other tool may be attached to the lower end of the cutter body 62a and the apparatus lowered into the bore around the pipe to be severed. The shoe is provided for cutting away the sand and debris that may become packed around the pipe in order to permit the apparatus to descend over the pipe, or a conventional wall hook may be used to bring the stuck pipe and cutter into alignment. The aparatus may be rotated in order to rotate the shoe for this purpose, or raised or lowered without setting the cutters. In order to set the cutters, that is to bring them ino cutting relation with the pipe coupling, the apparatus is elevated and simultaneously rotated. This causes the pipe grips 69 to yieldably engage the pipe coupling and compresses the spring 65 and carries the pins 72 up into interlocking relation with the pins 71. The cutter operator is thereby retarded, or caused to lag relative to the rotation of the body 62a which in turn causes the heads 75 to impinge against the outer beveled faces on the free edges of the cutter carriers and to contract said carriers and thus bring the cutters underneath the pipe coupling to be cut away. As the apparatus is gradually fed upwardly and rotation continued the cutters will cut or mill away the coupling along the line of its threads until the sections of pipe, united by the coupling, are separated. The severed section of pipe may then be pulled out, resting on the cutter carriers.

In Figures 19, 20 and 21, another type of outside cutter is illustrated wherein the numeral 80 designates the tubular housing which is attached to the lower end of the drill stem. Threaded to the lower end of the housing there is a tubular cutter body 81. This body has vertical slots 82 in which the inwardly converging yieldable cutters 83 work, said cutters being anchored to said body, at their lower ends and having their upper ends free.

Fitted within the housing 80 there is a tubular controller 84 whose lower end is reduced, forming the external annular shoulder 85, and fitted down into the body 81, with said shoulder 85 resting on the upper end of the body. The controller has a limited vertical movement in the housing, the range of movement being limited between the upper end of said body and the internal annular shoulder 86 in the upper end of the housing.

The controller has radial slots 68 in which the pipe grips 69 are inserted and surrounding said grips there is a coil spring 70 permitting radial movement of the griups but holding them yieldingly against the coupling of the pipe, or pipe to be severed.

The upper end of the controller has an inverted J-slot 87 whose upper end has a lateral seat 88 and the housing 80 has an inwardly projecting pin 89 adapted to work in said slot.

When the pin 89 is located in the seat 88 the reduced lower end of the controller fits between the upper ends of the cutters 83, and serves as a cutter retractor. In this position the apparatus will move over the pipe to be cut, as a unit. The apparatus may thus be lowered to the desired point with the grips 69 around and in contact with the pipe coupling. The stem and housing may be now rotated to the left, to unseat the pin 89, and then lowered to disengage the cutters from the lower end of the controller and the cutters will then spring inwardly and engage underneath the pipe coupling, as shown in dotted lines in Figure 20.

The cutters are now fed upwardly by a gradual upward pull on the drill stem and rotated to the right. During this operation the lower end of the controller will seat around said cutters on the outside, and hold them securely in cutting relation with the lower end of the coupling and by a continued rotation the coupling will be gradually milled off along the line of its threads until the pipe is severed. The severed section may then be pulled from the bore resting on said cutters. In this type of outside cutter the apparatus cannot be disengaged from the pipe, when once engaged therewith, until the severed section is withdrawn.

In Figures 22 to 25 a modified form of outside cutter is shown wherein provision is made for releasing the cutters from the severed section in case said section cannot be dislodged. In this form the cutter carriers 90 are pivoted, at their lower ends in the slots 82 and their upper ends are free and provided with the lateral spiralled gear-like teeth 91. These carriers have the vertically adjustable cutters 92 seated therein on the adjusting screws 93 and with their upper ends projecting above the carriers and provided with cutting edges.

Fitted within the upper end of the cutter body and attached to the controller 84a there is a cutter control ring 94 having the depending racks 95 having spiralled gear-like teeth intermeshing with the cutter carrier teeth 91. The controller 84a has a vertical slot 96 with the upper and lower lateral J-seats 97 in which the pin 89 works. When this pin is seated in the upper seat 97 the rack members 95 will hold the cutter carriers in outward, or retracted position and the apparatus may be lowered until the grips 69 engage the coupling to be cut away. The drill stem and housing are now turned to the left to unseat said pin and then lowered and turned to the right to seat the pin in the lower seat 97. As the cutter body and cutter carriers will be lowered with it and intermeshing gear teeth of the carriers and rack members 95 will operate to contract the cutters and carry them beneath the coupling to be milled away and by an upward feed on the apparatus and the simultaneous rotation thereof, to the right, the coupling may be cut away and the pipe thus severed.

In case the severed section cannot be dislodged the stem and housing may be again turned to the left to unseat the pin 89 from the lower seat 97 and then elevated and the pin seated in the upper seat 97 and by said movement the cutter carriers and cutters will be carried outwardly and disengaged from the coupling by the intermeshed teeth of said carriers and rack members 95 and the apparatus then withdrawn.

In Figures 26 to 39 inclusive still another form of the cutter is shown embodying certain parts which are common in construction and function to similar parts shown in some of the forms hereinbefore described. These common parts are designated by similar reference characters and it is not thought necessary to again describe them in connection with the description of the construction and operation of the form of cutter shown in these figures.

In the figures here described the tube 9 has an inserted tubular coupling 100 and dowels 101 are driven through the cross slots 102 in the body of the mandrel 7a and connected into said coupling thus forming a cross head. The tube 9' is connected to said cross head and extends downwardly through the stuffing box 8a carried by the upper end of the sleeve 103. The dowels 101, of the cross head rest on the upper ends of the connecting rods 104. These rods work through suitable oppositely disposed vertical bearings in the mandrel 7a and which extend from the cross slot 102 down through said mandrel. These rods 104 rest on the washer 105 having prongs 106 extending upwardly into slots 107 in the lower end of the mandrel, as illustrated in dotted lines in Figure 28, thus permitting axial movement of the washer 105 but preventing its rotation with respect to the mandrel 7a. The washer 105 rests on anti-friction washers 16a which in turn rest on the male friction clutch sleeve 108. The sleeve 108 has oppositely disposed peripheral bosses 109 at its upper end, as shown in Figure 32, which fit loosely in the corresponding slots 110, in the pronged sleeve 111 thus permitting said clutch sleeve 108 to have limited axial movement but holding it against rotation with reference to the sleeve 111. The pronged sleeve 111 is secured to the retainer 19a which in turn is secured to the housing 17a of the expander 13a, in both forms, here shown by left hand threads. The said friction clutch sleeve 108 is provided with oppositely disposed slots 112, extending to its lower end and so proportioned as to slidably receive the interior lugs 113 of the female friction clutch discs 114, of the usual multiple disc friction clutch type. Alternatively arranged with respect to the female clutch discs 114 are the male friction clutch discs 115 with opposed peripheral lugs so proportioned as to slidably fit into opposite slots 116 in the female friction clutch sleeve 117. This sleeve 117 is rotatably mounted in the retainer housing 19a and the male clutch sleeve 108 is rotatably mounted on the sleeve 103. The female clutch sleeve 117 is thickened inwardly beneath the clutch disc so as to form an annular bearing for the lower end of the sleeve 108, and to receive the packing rings 18c. Surrounding said sleeve 117 are packing rings 118.

The female clutch sleeve 117 has a downward extension 119 so formed as to permit a limited rotation or oscillation in the longitudinal recess 120 in one side of periphery of the cutter body 40 which is usually made integral with its spindle 20c and this extension 119 is so formed as to provide a hinged joint on one edge with the knife holder 121. This extension 119 has an arcuate recess 122 at its outer lower extremity so formed as to extend down under the guide cuff 123. A face cam 124 is formed on the lower end of this extension 119.

The knife holder 121 is formed of two parts, right and left, one above and the other beneath, the disc-like knife 33a, for convenience in assembly. The knife 33a is rigidly mounted on an axle 125, preferably formed integral therewith and whose oppositely disposed ends fit into renewable bushings 125a in the knife holder 121, as shown in dotted lines in Figure 29. Similar removable bosses 126 concentric with and disposed at each end of the knife axle protrude from the knife holder 121 into substantially arcuate recesses 127 eccentrically placed. The knife holder 121 is supported, during the cutting operation, on the bottom of the recess 128 formed in the cutter body 20c as shown in Figures 29, 36 and 37.

The face cam 124, at the lower end of the extension 119 permits the pump pressure to close the valve 129 under the influence of the fluid pressure, when the knife is out, and this permits the flat pin 130 to depress the lever 131, and lift the rod 132 into the cam recess 120.

In operation, after the slip 10c has engaged the inside of the casing and the drill stem is rotated to the right, the pump is started and fluid, under pressure, is pumped down through the stem and communicated to the clutch through the pump plunger, tube 9, cross head, connecting rods, the pronged washer and the friction washers. The male friction clutch sleeve 108 is pressed downwardly and closes the multiple disc clutch, said male friction sleeve is now held against rotation by the pipe engaging slip 10c through its slip seat 17' and attached housing 19a with its attached jaw clutch and the drag of the clutch tends to hold the female friction clutch sleeve 117 from rotating.

If now the drill stem, mandrel and cutter body are rotated to the right the cutter wheel 33a will be forced outwardly against the inside of the casing to be cut, the outward pressure of the cutter wheel 33a, as it rotates in its cut on the inside of the casing, will depend on the drag of the clutch, which in turn is regulated through the pump pressure, and the pump in turn is controlled by the operator.

When the cut is completed the valve 129 will be closed by the fluid pressure in the tube 9'. This valve is prevented from closing until the cut is completed because the rod 132 is prevented from rising until the cam face 124 has been dragged back to the rod by the clutch.

After the cut is completed the pump pressure is nearly all released and the drill stem, with its rigidly attached parts, is rotated a part of a turn to the left and the clutch bringing the cutter into sheathed position and opening the valve 129. This permits the pump to reestablish circulation and give the operator notice that the cutter is closed. If now the cut-off section cannot be pulled the slip 10c can be released and a shorter cut made, or the cut off sections, if it can be pulled, can, after being loosened, be released and more cuts may be made and all pulled together.

In Figures 40, 41 and 42 a slightly modified form of the cutters are shown embodying a housing 19d and the friction clutch 117' rotatably fitted into the lower end thereof. Within this sleeve there is the cutter body 40d and mounted in this cutter body there are the holders 32d which oscillate, in suitable bearings in the holder eccentric to the axis of said body, and the clutch sleeve 117' carry inwardly projecting arms 133 that engage extension 134 of the cutter holders and thereby communicate the clutch action to the cutters during the cutter operations. After the cut is complete the opposite sides of the slot 135 close the cutters within the cutter holder. The operation of this form of cutter is similar to the form shown in Figures 36 to 39 inclusive.

It will be noted that applicant is enabled by the use of any of the combined cutting and pulling devices disclosed herein, to place both tools in combination upon a single string of pipe, and to insert the same into a well and into contact with a pipe concentric therewith and to rotate the same and cut the pipe and to then grip the pipe and withdraw the same from the well; or, in case the severed section cannot be withdrawn, the device may be released and another cut or cuts be made until a section thus severed can be withdrawn from the hole.

It often happens that strong gas, oil or water under pressure is encountered causing the well to "heave", that is, causing the formation to be forced up into the well bore often resulting in the sticking of the drill stem, or the fishing apparatus. Sometimes the pressure is so great as to cause a violent and dangerous blowout. This is more liable to occur when the casing is cut in two or the packing or seal is broken in the process of removing the stuck pipe or casing. In order to prevent such occurrence a novel type of blow out preventer has been designed which is illustrated in Figures 43 and 44. Referring to these figures the numeral 220 designates a hollow head whose lower end is reduced and externally threaded for attachment to the surface casing or one of the larger casings not to be removed and is provided with a laterally tapped hole 221 for the connection of a pressure pipe leading from the pump.

Within the head there is a tubular sleeve 222 preferably formed of thick rubber or other yieldable material with a passageway therethrough whose upper and lower ends are flared. Screwed into the upper end of the head there is a gland 223 whose lower end surrounds the upper end of the sleeve 222 and has an annular inside rib 224 which fits into a corresponding outside groove in said sleeve. Fitted within the upper end of the sleeve there is an annular downwardly tapering wedge 225 and a tubular nipple 226 is threaded into the upper end of the gland 223 and abuts said wedge and holds it in position. The sleeve 222 is thus anchored in position in the head. The operating stem 2 works through this blow out preventer and is closely surrounded by the sleeve 222 which forms a tight joint therewith and yet which is sufficiently yieldable to permit the passage through it of the collars connecting the joints of the drill stem.

I have shown what I now consider the preferred forms of this apparatus but it is obvious that mechanical changes may be made therein and equivalents substituted for the parts shown and I hereby reserve the right to make such mechanical changes and adaptations as may be found desirable or practical and which may be comprehended within the scope of the appended claims.

What I claim is:

1. An apparatus for removing pipe and the like from a well bore including a pipe severing means, releasable pipe engaging means adapted to engage and disengage and reengage the pipe to be cut and through which the pipe may be held under tension during the operation of the severing means said severing means being operable to perform more than one cut and a single string of pipe to operate both the engaging means and severing means.

2. The method of cleaning a well bore containing stuck casing or the like, which comprises lowering into the well bore a single string of pipe carrying combined cutting and pulling means, manipulating the single string of pipe to engage the pulling means with the casing, pulling on the casing by raising the single string of pipe while the pulling means is engaged with the stuck casing, applying fluid under pressure down through the single string of pipe and through the pulling means to force the cutting means into cutting relation with the casing, rotating the single string of pipe to operate the cutting means to sever a section of the stuck casing, releasing the fluid pressure in the single string of pipe to permit the release of the cutting means from the casing, pulling on the severed section of the casing to remove the severed section by raising the single string of pipe while the pulling means remains engaged with the severed section of casing, manipulating the single string of pipe to release the pulling means from the severed section of casing, raising the single string of pipe together with the attached combined released pulling means and released cutting means to a higher position, manipulating the single string of pipe to reengage the pulling means with the severed section of casing, pulling on the severed section of the casing by raising the single string of pipe while it is attached to the pulling means when engaged with the severed section of casing, forcing fluid under pressure down through the single string of pipe to again force the cutting means into cutting relation with the casing, rotating the single string of pipe to operate the cutting means to sever the cut off section, releasing the fluid pressure in the single string of pipe so as to again permit the release of the cutting means from the casing, raising the single string of pipe out of the well bore together with the combined cutting and pulling means and the last severed section of the stuck casing.

3. The method of cleaning a well bore containing stuck casing, or the like, which comprises lowering into the well bore a retractable cutting means and a releasable pulling means both carried by and arranged to be lowered and manipulated by a single string of pipe, manipulating the pulling means into pulling engagement with the stuck casing, manipulating the cutting means to sever the casing, retracting the severing means, raising and freeing the severed section of casing, releasing the pulling means from the freed severed section of casing, while still in the well, lowering the cutting and pulling means to a lower position, reengaging the pulling means with the remaining stuck casing, severing a second section of the stuck casing and withdrawing both severed sections at one trip into the well bore.

4. The method of cleaning a well bore containing casing or the like, which comprises lowering into the bore only a single string of pipe attached to and carrying a releasable pulling and retractable cutting means, manipulating the pulling means from the severed section, raising the pulling and cutting means to a higher position with the severed section of casing and while the pulling and cutting means remain in the well bore re-engaging the pulling means with the severed section of casing, manipulating the cutting means to sever the casing at another place, and withdrawing the pulling and cutting means with a section of the casing.

5. The method of cleaning a well bore containing casing, or the like, which comprises lowering into the bore only a single string of pipe attached to and carrying releasable pulling means and cutting means manipulating the pulling means into pulling engagement with the casing and rotating the cutting means by turning the pipe to sever the casing, pulling on the severed section, releasing the pulling means from the severed section of a casing, reengaging the pulling means at a higher position on the severed section of casing, reserving the casing, withdrawing the severed section of casing.

6. An apparatus for removing pipe and the like from a deep well bore, including a single string of tubes, releasable pipe engagement pulling means through which the pipe may be put under tension while being cut and pipe cutting means associated therewith, the cutting means being rotatable by turning the string of tubes.

7. An apparatus for removing pipe and the like from a bore, comprising a single string of tubes, cutting means for cutting said pipe, said cutting means being rotatable by turning the string of tubes, said cutting means embodying a sheathing means whereby the cutters may be withdrawn into the cutting means while removing the severed pipe from the bore and releasable pulling means associated therewith and adapted to engage and pull on said pipe and also adaptable to release an engagement with said pipe.

8. An apparatus for removing pipe and the like from a deep well bore, including a single string of tubes, releasable pipe engaging means rotatively mounted relatively to the string of tubes and operable means adapted to engage, pull on, disengage and reengage said pipe all without removing said engaging means from the well bore, and cutting means adapted to cut pipe in a well bore, said cutting means being associated with the string of tubes.

9. An apparatus for removing pipe and the like from a deep well bore, comprising pipe engaging means adapted to pull on the pipe, cutting means adapted to cut pipe and a single manipulating means connecting with said other means for engaging, disengaging and reengaging the first means for pulling on the pipe and manipulating the second means while cutting the pipe all during a single trip in the well bore.

10. An apparatus for removing pipe and the like from a well bore, comprising pipe cutting means, and pipe pulling means adapted to remove stuck pipe from the well bore, all in combination with a single string of tubes for repeatedly operating the cutting means and for repeatedly operating the pulling means into and out of engagement with the stuck pipe.

11. In a well cleaning apparatus the combination of severing means, indicator means adapted to indicate to the operator the completed action of the severing means, and a grapple carried by and operable through the same means used to operate the severing means to manipulate the grapple repeatedly into and out of pipe pulling position while in the well.

12. The method of cleaning out a deep well bore which includes securing a combination apparatus to a single string of tubes, lowering the combination into a well bore from which objects are to be removed, causing fluid to flow through the string and combination to remove earthy materials from an object in the well bore, rotating the combination which includes earth disintegrating means, circulating fluid through the string while rotating to remove the disintegrating material, engaging the object in the well bore, cutting the object in the well bore and removing a section of the object together with the combination.

13. The method of removing stuck pipe and the like from a well bore which includes, lowering a combination device into the well bore, manipulating the combination to disintegrate earthy material, circulating fluid in the well bore to remove the earthy material, engaging the stuck pipe, manipulating the combination, severing the stuck pipe and removing a section of the pipe together with the combination.

14. The method of removing stuck pipe and the like from a well bore which includes lowering a device into the well bore to adjacent the stuck pipe, causing fluid to circulate through the device, rotating and lowering the device to below the top of the stuck pipe while maintaining fluid circulation, engaging the stuck pipe, cutting the stuck pipe, indicating the cut is completed, withdrawing a cut off section of pipes together with the device.

15. The method of removing stuck pipe and the like from a high pressure deep well that may "blow" or "heave" which comprises lowering a device into the well by a single string of tubes to adjacent the stuck pipe, circulating fluid adjacent the stuck pipe lowering the device to below the top of the stuck pipe while circulating fluid, cutting the stuck pipe preventing a "blow out" or a "heave" of the well while withdrawing a section of the stuck pipe together with the device by maintaining a seal between the well casing and the string of tubes and couplings as they pass the seal.

16. In an apparatus for cutting and pulling, the combination of earth cutting means adapted to disintegrate earthy materials, earth removing means adapted to remove disintegrated material, metal cutting means adapted to cut metalic substances, and releasable pulling means adapted to engage with and withdraw an object.

17. In apparatus for use in a high pressure deep well, the combination of cutting means suitable for disintegrating earthy material, removing means suitable for removing earthy material, cutting means suitable for cutting metallic substance, releasable pulling means suitable for engaging with, pulling on and withdrawing an object, a jointed manipulating means suitable for manipulating the preceding means and sealing means suitable to prevent the passage of fluid in an annular space about the manipulating means while the joints of the manipulating means are passing the sealing means, all cooperating to remove objects while preventing a blowout of the high pressure well.

18. A pipe puller including an operating stem having an annular external abutment, a sleeve-like downwardly flared mandrel on said stem and supported by said abutment, expansible pipe engaging means around the stem above the mandrel, releasable interengaging means carried by the stem and engaging means respectively, adapted, when engaged to hold said pipe engaging means out of cooperating relation with the mandrel, said pipe engaging means having a free longitudinal movement on the stem when said interengaging means are released, and antifriction means between said abutment and mandrel to facilitate the free rotation of the stem relative to the mandrel.

19. A device of the character described including an operating stem and means at the lower end thereof for connecting the same to a casing cutter, means for anchoring said stem to a surrounding casing in a well bore, said anchoring means comprising an upwardly tapering mandrel on the stem and rotatable independent thereof and expansible casing engaging means about the stem and adapted to be expanded by said mandrel into engagement with the casing.

20. A spear comprising in combination with a drill stem, a shank operatively connected with the drill stem, a tapered mandrel carried by and surrounding the lower portion of the shank, a slip sleeve surrounding the shank and having its lower end portion provided with gripping arms, the tapered mandrel engaging said gripping arms from within, and a thrust bearing carried by the shank and with which the lower end of the mandrel engages.

21. In combination, a mandrel, a pipe cutter operatively connected therewith, pipe engaging means rotatable on said mandrel adapted to grip said pipe to prevent upward movement of said mandrel, means to connect said mandrel and the vertical pulling means by which said mandrel and pipe cutter may be raised and simultaneously rotated.

22. In combination, a mandrel, a pipe cutter operatively connected therewith, pipe engaging means on said mandrel above said cutter adapted to engage or disengage said mandrel, said mandrel and pipe cutter being rotatively mounted with reference to said pipe-engaging means when said pipe engaging means is in position to prevent vertical movement of the cutter.

23. In a casing cutter, a mandrel, an upwardly tapered collar supported thereon, a sleeve on said mandrel, the lower end of said sleeve being slotted and provided with pipe engaging slip jaws shaped to fit upon the tapered surface of said collar, releasable means on said mandrel to support said sleeve and means on said mandrel adapted to engage said collar on the vertical movement of said mandrel, and move said collar from engagement with said jaws and casing cutters operatively connected with said mandrel and adapted to be retained in a horizontal cutting plane by said pipe engaging jaws.

24. In a casing cutter, a mandrel, an upwardly tapered collar supported thereon, pipe engaging jaws shaped to fit upon said collar, said mandrel having a shoulder above said collar, said collar and jaws being slidable on said mandrel whereby a blow may be delivered upon said collar by said shoulder to drive said collar from position beneath said jaws and casing cutters operatively connected with said mandrel and adapted to be retained in a horizontal cutting plane by said pipe engaging jaws.

25. In a well cleaning apparatus the combination of a pipe cutter with a pipe puller for severing and removing stuck pipe from a well bore; said pipe cutters including a guide at its lower end with a cutting edge and a water course therethrough to cut away obstructions in the well bore the detritus of which may be removed by a fluid passing through the water course, a cutter body attached to said guide to rotate said guide when said body is rotated, said cutter body being provided with threads at its upper and lower ends and with a lateral aperture connecting the vertical central bore through said body to the space outside of said body, a movable cutter carrier in said body above said guide, a cutter rotatably mounted on said carrier and adapted to be protruded out of the aperture in said body, a movable fluid plunger with a vertical central opening through it located above said cutter, a cup leather about said plunger, said plunger being associated with said cutter carrier through a sliding connection, said plunger when moved downwardly, as by increased fluid pressure from above on the top of said plunger, forces said cutter to protrude out of the aperture, a coil spring to raise said plunger and to retract said cutter from the protruded position, a valve below the cutter operable to control the fluid flow in such a manner as to indicate a change in the fluid flow when the cutter has been protruded sufficiently to sever the pipe, a locking means to prevent the cutter from being protruded while said guide is cutting away an obstruction and while forcing fluid downwardly through said combination to remove the detritus as it is cut away; said pipe puller including a hollow mandrel threaded at its upper and lower ends, the lower end of said mandrel being so associated with said cutter body as to transmit a right hand rotary motion to said cutter body for cutting purposes and also to transmit longitudinal movement to said cutter body, a hollow connector attached to the upper end of said mandrel said connector being provided with means at its upper end for the attachment of a string of pipes, a hollow upwardly and inwardly tapering jaw expander slidably and rotatably mounted on said mandrel above said cutter body, means associated with said mandrel limiting both the upward and downward relative sliding motion of said expander, a bearing around said mandrel to support said expander, a pipe engaging slip movably mounted on said mandrel above said expander, yieldable pipe grips at the upper end of said slip formed by enlarging and vertically slotting the upper end of said slip, expansible outwardly toothed pipe engaging jaws at the lower end of said slip formed by vertically slotting the lower end of said slip, the inner faces of said jaws being flared outwardly and downwardly and a slip support associated with said slip and manipulatable by movement of said mandrel to be engaged with said slip to sustain said slip in a nonengaging position to allow the upward movement of said combination relative to the pipe around said combination while in the well bore.

26. In a well cleaning apparatus the combination of a pipe cutter with a pipe puller for severing and removing stuck pipe from a well bore; said pipe cutter including a guide at its lower end with a cutting edge and a water course therethrough to cut away obstructions in the well bore the detritus of which may be removed by a fluid passing through the water course, a cutter body attached to said guide to rotate said guide when said body is rotated, said cutter body being provided with threads at its upper and lower ends and with a lateral aperture connecting the vertical central bore through said body to the space outside of said body, a movable cutter carrier in said body above said guide, a cutter rotatably mounted on said carrier and adapted to be protruded out of the aperture, in said body, a movable fluid plunger with a vertical central opening through it located above said cutter, a cup leather about said plunger, said plunger being associated with said cutter carrier through a sliding connection, said plunger when moved downwardly, as by increased fluid pressure from above on the top of said plunger, forces said cutter to protrude out of the aperture, a coil spring to raise said plunger and to retract said cutter from the protruded position, a valve below the cutter operable to control the fluid flow in such a manner as to indicate a change in the fluid flow when the cutter has been protruded sufficiently to sever the pipe, a locking means to prevent the cutter from being protruded while said guide is cutting away an obstruction and while forcing fluid downwardly through said combination to remove the detritus as it is cut away; said pipe puller including a hollow mandrel, a jaw expander slidably and rotatably mounted on said mandrel above said cutter body, a pipe engaging slip movably mounted on said mandrel above said expander, and means controllable from without the well bore to operate the cutter and control the engagement of and the release of said slip.

27. In a well cleaning apparatus the combination of a pipe cutter with a pipe puller for severing and removing stuck pipe from a well bore; said pipe cutter including a body and a fluid pressure controlled pipe severing means; said pipe puller including a hollow mandrel threaded at its upper and lower ends, the lower end of said mandrel being so associated with said cutter body as to transmit a right hand rotary motion to said cutter body for cutting purposes and also to transmit longitudinal movement to said cutter body, a hollow connector attached to the upper end of said mandrel said connector being provided at its upper end for the attachment of a string of pipes, a hollow upwardly and inwardly tapering jaw expander slidably and rotatably mounted on said mandrel above said cutter body, means associated with said mandrel limiting both the upward and downward relative sliding motion of said expander, a bearing around said mandrel to support said expander, a pipe engaging slip movably mounted on said mandrel above said expander, yieldable pipe grips at the upper end of said slip formed by enlarging and vertically slotting the upper end of said slip, expansible outwardly toothed pipe engaging jaws at the lower end of said slip formed by vertically slotting the lower end of said slip, the inner faces of said jaws being flared outwardly and downwardly and a slip support associated with said slip and manipulatable by movement of said mandrel to be engaged with said slip to sustain said slip in a non-engaging position to allow the upward movement of said combination relative to the pipe around said combination while in the well bore.

28. In a well cleaning apparatus the combination of a pipe cutter with a pipe puller for severing and removing stuck pipe from a well bore; said pipe cutter including a guide at its lower end with a cutting edge and a water course therethrough to cut away obstructions in the well bore the detritus of which may be removed by a fluid passing through the water course, a cutter body attached to said guide to rotate said guide when said body is rotated, said cutter body being provided with threads at its upper and lower ends and with a lateral aperture connecting the vertical central bore through said body to the space outside of said body, a movable cutter carrier in said body above said guide, a cutter rotatably mounted on said carrier and adapted to be protruded out of the aperture, in said body, a movable fluid plunger with a vertical central opening through it located above said cutter, a cup leather about said plunger, said plunger being associated with said cutter carrier through a sliding connection, said plunger when moved downwardly, as by increased fluid pressure from above on the top of said plunger, forces said cutter to protrude out of the aperture, a coil spring to raise said plunger and to retract said cutter from the protruded position, a valve below the cutter operable to control the fluid flow in such a manner as to indicate a change in the fluid flow when the cutter has been protruded sufficiently to sever the pipe, a locking means to prevent the cutter from being protruded while said guide is cutting away an obstruction and while forcing fluid downwardly through said combination to remove the detritus as it is cut away; said pipe puller being characterized by being capable of being engaged with, released from and reengaged with a stuck pipe in a well bore without withdrawing said combination from the well bore.

29. A releasable puller adapted to engage objects stuck in a well bore including a yielding engaging means, an actuating member having a water course therethrough and movable into one position, relative to said engaging means, to force said engaging means into secure grip with the object to be pulled, and into another position to permit said engaging means to partially release said grip on said object, to permit the puller to be moved bodily, relative to said object, said actuating member being rotatable relative to said engaging means when said engaging means is in gripping position, said actuating member being provided at its lower end with means suitable for attaching an auxiliary device.

30. A releasable grapple adapted to be inserted into a well bore to engage a stuck object therein, and including a controlling mandrel, a grappling member, and a resilient member, said members being relatively movable with respect to said mandrel and means operable from without the well bore and effective to actuate said mandrel to engage the grappling member with or release the same from said stuck object, said actuating member being provided at its lower end with means suitable for attaching an auxiliary device and adapted to rotate within said grappling member when said grappling member has engaged said stuck object.

31. In a well cleaning apparatus the combination of a guide, with a pipe cutter, a pipe puller, and a tubular member; said guide including a cutting edge for cutting away an obstruction and a fluid passageway to permit fluid circulation for removing the detritus of the obstruction; said pipe cutter including a cutter body having a vertical central bore and a lateral aperture, a cutter carrier, a fluid plunger associated with said carrier through a sliding connection, a cutter rotatably mounted on said carrier, an interlock for locking said cutter in retracted position when circulating fluid while cutting away the obstruction, and a valve for controlling the fluid circulation; said pipe puller including a pipe engaging slip movably mounted above said guide and means for releasing said slip from engagement with the pipe.

32. In a well cleaning apparatus the combination of a tubular member with a pipe puller and a pipe cutter; said pipe puller including an expander sleeve mounted on said tubular member, a pipe engaging slip with yieldable pipe grips at its upper end for frictionally engaging the pipe to be pulled, a slip support to hold said slip in a releasable position; said pipe cutter including a pipe severing means and operable means for protruding and retracting said severing means.

33. In a device of the character described a single string of pipe, a pipe cutter operatively connected with the lower end thereof, knives on said cutter adapted to be extended into contact with an adjacent concentric pipe and to cut the same operative through the rotation of said string, and a pipe-gripping device on said string adapted to engage said concentric pipe and remove the cut-off portion severed by said cutter when said string is elevated.

34. In a device of the character described, a single string of pipe, a pipe-cutter at the lower end thereof, cutting blades on said cutter normally retracted, hydraulically-operated means to extend said cutters, to engage a concentric pipe and to cut the same when said string is rotated, means on said string adapted to engage said concentric pipe operative by an upward pull on said string, and releasable means to support said pipe-engaging means in inoperative position, when desired.

35. In a device of the character described, a single string of tubular members, a cutter head secured to said string, pipe cutting blades on said head and normally housed therein, means to extend said cutting blades, said blades being adapted to cut a concentric pipe when said string is rotated and said blades extended, a pipe-pulling means on said string above said cutter, said pulling means being adapted to be brought into engagement with said concentric pipe to pull the cut-off section through an upward pull on said string.

36. A device for cleaning a well of stuck pipe, including a single tubular string, a cutting tool at the lower end thereof and adapted by rotation of said string to sever a concentric section of said stuck pipe, and a pipe gripping and pulling device on said string above said cutting tool, pipe engaging dogs on said pulling device adapted when said string is moved upwardly to engage said section of pipe and exert an upward tension thereon whereby a section of pipe may be cut and removed by one trip into the hole with said device.

37. A well cleaning apparatus including a single tubular string, a pipe cutter thereon comprising a head, cutter carriers therein, cutters on said carriers, means to extend said cutter carriers to bring said cutters into contact with said pipe, said head being rotatable by the rotation of said string, pipe engaging means on said string above said cutter, means to support said pipe engaging means out of pipe engaging position, said means being releasable and again supported in inoperative position as desired, by a partial rotation of said string, whereby said pipe may be engaged and pulled from the hole when it has been cut.

38. A method of removing stuck pipe from a well comprising lowering a cutting device and a pulling device on a single string of pipe into the well, bringing said cutting device into contact with said stuck pipe and rotating said string to sever said stuck pipe, engaging said pulling device with said severad pipe and withdrawing said string and said severed pipe from the well.

CHARLES R. EDWARDS.